United States Patent [19]

Shigedomi et al.

[11] Patent Number: 5,309,877
[45] Date of Patent: May 10, 1994

[54] OUTBOARD ENGINE ASSEMBLY AND INTERNAL COMBUSTION ENGINE THEREFORE

[75] Inventors: Hideo Shigedomi; Shinichi Miyakoshi, both of Saitama; Hiroyuki Nakayama, Tokyo, all of Japan

[73] Assignee: Honda Giken Kogyo Kabushiki Kaisha, Tokyo, Japan

[21] Appl. No.: 977,538

[22] Filed: Nov. 17, 1992

[51] Int. Cl.$^5$ .................................. F02F 7/00
[52] U.S. Cl. ........................ 123/19.5 P; 123/192.2; 123/579; 440/900
[58] Field of Search ............ 123/59 PC, 192.2, 195 P, 123/579, 580; 440/84, 900

[56] References Cited

U.S. PATENT DOCUMENTS

| | | |
|---|---|---|
| 3,742,922 | 7/1973 | Hisatomi et al. ............... 123/579 |
| 4,846,124 | 7/1989 | Suzuki et al. ............... 123/195 P |
| 5,036,805 | 8/1991 | Yamamoto et al. ............... 123/579 |

FOREIGN PATENT DOCUMENTS 59-176192  10/1984  Japan .
63-192693   8/1988  Japan .

Primary Examiner—Noah P. Kamen
Attorney, Agent, or Firm—Rosen Dainow & Jacobs

[57] ABSTRACT

An outboard engine assembly for use on a boat has an engine mechanism including in an upper region thereof an engine having a substantially vertical crankshaft and a vertical array of substantially horizontal cylinders. The engine mechanism is mounted on the stern of the boat by an attachment. The attachment includes a stern bracket adapted to be fixed to the stern of the boat, a swivel case supported on the stern bracket for vertical angular movement, a substantially vertical swivel shaft supported on the swivel case for horizontal angular movement, and a pair of upper and lower supports mounted on the swivel shaft and supporting the engine mechanism. The engine has joint members coupled to the upper support at a position between adjacent two crankshaft counterbalances which correspond to adjacent two cylinders, respectively, as viewed in side elevation, the joint members having respective portions located within a path of the two crankshaft counterbalances as viewed in plan. The engine mechanism also has a balancer mechanism mounted on a front wall of the engine for attenuating engine vibrations, and a fuel supply assembly mounted on an engine side wall.

27 Claims, 7 Drawing Sheets

OUTBOARD ENGINE ASSEMBLY AND INTERNAL COMBUSTION ENGINE THEREFORE

BACKGROUND OF THE INVENTION

1. Field of the Invention

The present invention relates to an outboard engine assembly for use on small boats which has in its upper region an internal combustion engine having a substantially vertical crankshaft and a vertical array of cylinders each extending substantially horizontally, and an internal combustion engine for use in such an outboard engine assembly.

2. Description of the Prior Art

Some outboard engine assemblies are mounted on the stern of a boat by an attachment including a stern bracket, a swivel case, a swivel shaft, etc., and include an engine supported by rearwardly extending upper and lower support arms disposed above and below, respectively, the attachment. The engine has a substantially vertical crankshaft and a vertical array of cylinders each having an axis extending substantially horizontally. The engine is disposed in an upper region of the outboard engine assembly by the upper support arm.

Increasing the engine displacement and the number of cylinders of such an outboard engine assembly for a higher engine output power results in an increase in the vertical dimension of the engine, i.e., in the vertical dimension of the outboard engine assembly above the upper support arm.

The outboard engine assembly is usually tiltable about a horizontal tilt axis in the attachment. If the vertical dimension of the outboard engine assembly above the upper support arm is increased, then when the outboard engine assembly is tilted upwardly at the time the boat is anchored or placed ashore, it projects greatly into the boat.

For reducing the size and weight of an outboard engine assembly, it has been proposed to couple the upper support arm to opposite sides of the engine as disclosed in Japanese laid-open patent publication No. 59-176192.

Japanese laid-open patent publication No. 63-192693 also shows an outboard engine assembly with an engine supported in an upper region by an upper support arm that is joined to opposite sides of the engine. The engine has a substantially vertical crankshaft whose lower end is connected to a vertical shaft for transmitting rotational power from the engine to a propeller shaft.

However, the lateral dimension or width of the above disclosed outboard engine assemblies is increased because the upper support arm is coupled to the opposite sides of the engine.

The engine of the outboard engine assembly disclosed in the latter publication has a balancer mechanism for attenuating engine vibrations, the balancer mechanism having balancer shafts parallel to the crankshaft of the engine. The balancer mechanism is positioned in an upper portion of the engine. The balancer mechanism thus positioned necessarily raises the center of gravity of the engine. Care should be exercised in the design of the outboard engine assembly to keep the balancer mechanism out of physical interference with various engine accessories including a carburetor, a starter motor, a flywheel, etc., and also with an engine support structure.

Another known outboard engine assembly with a substantially vertical crankshaft has a vertical array of two horizontal cylinders in its upper region and a single carburetor for supplying atomized fuel into combustion chambers in the cylinders. If the engine displacement is increased and three or more cylinders are used for a higher engine output power, then as many carburetors as the number of cylinders are required to be installed in a vertical array. The vertical array of three or more carburetors on one side of the engine cylinders puts a limitation on the space available around the engine, and necessitates a complex engine maintenance procedure.

SUMMARY OF THE INVENTION

It is an object of the present invention to provide an outboard engine assembly having a relatively small transverse dimension.

Another object of the present invention is to provide an outboard engine assembly which has a relatively small portion that projects into a boat when the outboard engine assembly is tilted upwardly.

Still another object of the present invention is to provide an outboard engine assembly having a balancer mechanism positioned out of physical interference with various engine components and an engine support structure without substantially raising the center of gravity of an engine.

A further object of the present invention is to provide an outboard engine assembly having a fuel supply assembly mounted on an engine side wall and arranged to create a relatively large space on the engine side wall.

A still further object of the present invention is to provide an internal combustion engine for use in an outboard engine assembly.

According to the present invention, there is provided an outboard engine assembly for use on a boat, comprising an engine mechanism including in an upper region thereof an engine having a substantially vertical crankshaft and a vertical array of substantially horizontal cylinders, the crankshaft having a plurality of axially spaced crankshaft counterbalances, and an attachment for mounting the engine mechanism on the stern of the boat. The attachment comprises a stern bracket adapted to be fixed to the stern of the boat, a swivel case supported on the stern bracket for vertical angular movement, a substantially vertical swivel shaft supported on the swivel case for horizontal angular movement, and a pair of upper and lower supports mounted on the swivel shaft and supporting the engine mechanism. The engine has joint members coupled to the upper support at a position between adjacent two of the crankshaft counterbalances which correspond to adjacent two of the cylinders, respectively, as viewed in side elevation, the joint members having respective portions located within a path of the two crankshaft counterbalances as viewed in plan.

According to the present invention, there is also provided an outboard engine assembly for use on a boat, comprising an engine mechanism including in an upper region thereof an engine having a substantially vertical crankshaft and a vertical array of substantially horizontal cylinders, the crankshaft having a plurality of axially spaced crankshaft counterbalances, and a vertical shaft disposed below the engine and operatively coupled to the crankshaft for rotating a propeller shaft in response to rotation of the crankshaft, and an attachment for mounting the engine mechanism on the stern of the boat. The attachment comprises a stern bracket adapted to be fixed to the stern of the boat, a swivel case supported on the stern bracket for vertical angular movement, a substantially vertical swivel shaft supported on the swivel case for horizontal angular movement, and a pair of upper and lower supports mounted on the swivel shaft and supporting the engine mechanism, the crankshaft being positioned rearwardly of the vertical shaft.

According to the present invention, there is further provided an outboard engine assembly for use on a boat, comprising an engine mechanism including in an upper region thereof an engine having a substantially vertical crankshaft, and an attachment having a pair of upper and lower supports for mounting the engine mechanism on the stern of the boat, the engine having joint members coupled to the upper support, and a balancer mechanism disposed upwardly of the joint members. The balancer mechanism comprises a support shaft extending parallel to the crankshaft, a driven gear mounted on the support shaft, and a weight mounted on the support shaft, the crankshaft including a counterbalance having a drive gear held in mesh with the driven gear.

According to the present invention, there is also provided an outboard engine assembly for use on a boat, comprising an engine mechanism including in an upper region thereof an engine having a substantially vertical crankshaft and a vertical array of substantially horizontal cylinders, and a vertical shaft disposed below the engine and operatively coupled to the crankshaft for rotating a propeller shaft in response to rotation of the crankshaft, stern of the boat. The attachment comprises a stern bracket adapted to be fixed to the stern of the boat, a swivel case supported on the stern bracket for vertical angular movement, a substantially vertical swivel shaft supported on the swivel case for horizontal angular movement, and a pair of upper and lower supports mounted on the swivel shaft and supporting the engine mechanism, the crankshaft being positioned rearwardly of the vertical shaft. The engine further has joint members coupled to the upper support, and a balancer mechanism disposed upwardly of the joint members, the balancer mechanism comprising a support shaft extending parallel to the crankshaft, a driven gear mounted on the support shaft, and a weight mounted on the support shaft, the crankshaft including a counterbalance having a drive gear held in mesh with the driven gear.

According to the present invention, there is also provided an internal combustion engine, comprising a vertical crankshaft, a vertical array of horizontal cylinders including respective combustion chambers, a plurality of pistons slidably disposed in the cylinders, respectively, and operatively coupled to the vertical crankshaft, fuel supply means mounted on an engine side wall for supplying fuel into the combustion chambers, a starter motor mounted on an opposite engine side wall for rotating the crankshaft, and a balancer mechanism operatively coupled to the crankshaft and mounted on an engine wall other than the engine side walls remotely from the combustion chambers. The balancer mechanism comprises a support shaft extending parallel to the crankshaft, a driven gear mounted on the support shaft, and a weight mounted on the support shaft, the crankshaft including a counterbalance having a drive gear held in mesh with the driven gear.

According to the present invention, there is further provided an outboard engine assembly for use on a boat, comprising an engine mechanism including in an upper region thereof an engine having a substantially vertical crankshaft, an even number of at least four substantially horizontal cylinders arranged in a vertical array and having respective combustion chambers, a plurality of intake passages communicating with the combustion chambers, respectively, and opening at an engine side wall, and fuel supply means mounted on the engine side wall for supplying fuel into the intake passages, and an attachment for mounting the engine mechanism on the stern of the boat. The fuel supply means comprises a vertical array of carburetors each associated with adjacent two of the cylinders, and a vertical array of intake manifolds each connecting one of the carburetors to adjacent two of the cylinders. Each of the carburetors comprises pair of first and second intake barrels disposed alongside of and parallel to one of the adjacent two cylinders; each of the intake manifolds comprises a pair of first and second intake passageways, the first intake passageway connecting the first intake barrel to one of the intake passages corresponding to the adjacent two cylinders, the second intake passageway connecting the second intake barrel to the other of the intake passages corresponding to the adjacent two cylinders.

According to the present invention, there is also provided an internal combustion engine comprising a vertical crankshaft, a flywheel mounted on an upper end of the vertical crankshaft, an even number of at least four horizontal cylinders arranged in a vertical array and having respective combustion chambers, a plurality of pistons slidably disposed in the cylinders, respectively, and operatively coupled to the vertical crankshaft, a plurality of intake passages communicating with the combustion chambers, respectively, and opening at an engine side wall, fuel supply means mounted on the engine side wall for supplying fuel into the combustion chambers through the intake passages. The fuel supply means comprises a vertical array of carburetors each associated with adjacent two of the cylinders, and a vertical array of intake manifolds each connecting one of the carburetors to adjacent two of the cylinders; each of the carburetors comprises a pair of first and second intake barrels disposed alongside of and parallel to one of the adjacent two cylinders; each of the intake manifolds comprises a pair of first and second intake passageways, the first intake passageway connecting the first intake barrel to one of the intake passages corresponding to the adjacent two cylinders, the second intake passageway connecting the second intake barrel to the other of the intake passages corresponding to the adjacent two cylinders, the carburetors being positioned upwardly of an engine bottom wall and downwardly of the flywheel.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The terms "forward," "rearward," "front," "rear," "upper," "lower," and other similar words are used herein with respect to the geometric center of a boat on which an outboard engine assembly according to the present invention is installed.

Figure 1:
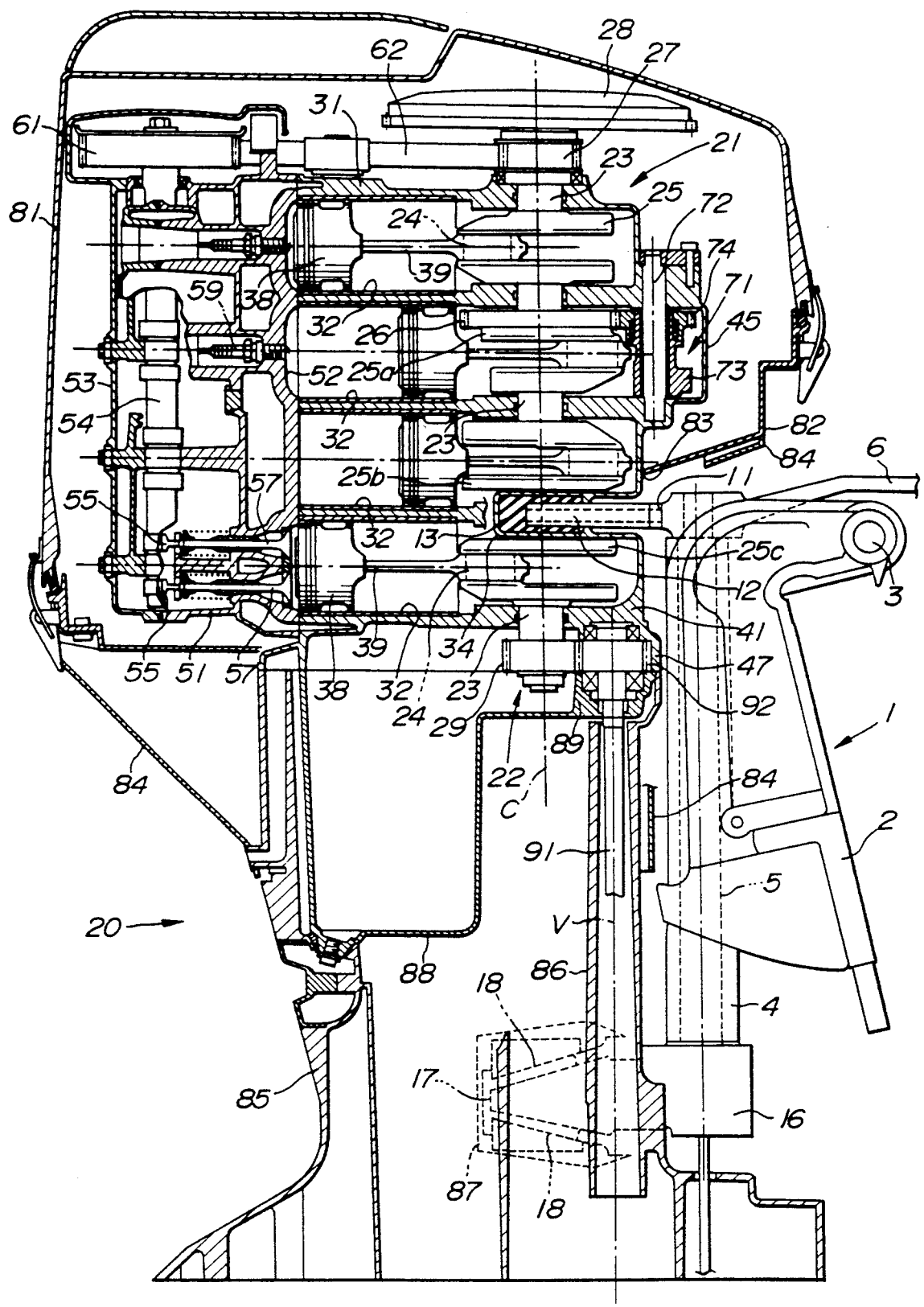
FIG. 1 is a vertical cross-sectional view of an outboard engine assembly according to an embodiment of the present invention.

As shown in FIG. 1, an outboard engine assembly according to an embodiment of the present invention has an attachment 1 and an engine mechanism 20 to be mounted on the stern of a boat (not shown) by the attachment 1.

The attachment 1 comprises a stern bracket 2 to be fixed to the stern of the boat, a swivel case 4 swingably supported on the stern bracket 2 by a substantially horizontal tilt shaft 3, a substantially vertical swivel shaft 5 angularly movably supported in the swivel case 4, and forked upper and lower supports 11, 16 secured to upper and lower ends, respectively, of the swivel shaft 5 and supporting the engine mechanism 20. The upper support 11 has an integral lever 6 which extends forwardly, i.e., to the right in FIG. 1, for attachment to a steering handle or a remote control steering cable (not shown).

The upper support 11 has a pair of rearwardly extending arms 12 (see also FIGS. 2 and 3) horizontally spaced from each other, and the lower support 16 has a pair of rearwardly extending arms 17 horizontally spaced from each other. The engine mechanism 20 is supported by these arms 12, 17 through rubber dampers 13, 18.

The engine mechanism 20 includes an in-line multi-cylinder four-cycle engine 21 in its upper region. The engine 21 has a substantially vertical crankshaft 22 and a vertical array of (four in the illustrated embodiment) cylinders 32 each extending rearwardly substantially in the horizontal direction. The engine 21 also has a cylinder block 31 in which the cylinders 32 are defined, a plurality of pistons 38 slidably fitted in the respective cylinders 32, a plurality of connecting rods 39 connecting the pistons 38 to the crankshaft 22, a crankcase 41 joined to the cylinder block 31 and housing the crankshaft 22, a cylinder head 51 mounted on the cylinder block 31, a plurality of combustion chambers 52 defined in the cylinder head 51 and opening into and aligned with the respective cylinders 32, a head cover 53 mounted on the cylinder head 51, a pair of camshafts 54 (see also FIG. 3) rotatably supported in the cylinder head 51, a plurality of rocker arms 55, 56 slidably held against the camshafts 54, respectively, a plurality of intake and exhaust valves 57, 58 movably supported in the cylinder head 51 and having respective valve heads positioned in the combustion chambers 52, the intake and exhaust valves 57, 58 being actuatable by the rocker arms 55, 56, respectively, and a plurality of spark plugs 59 mounted in the cylinder head 51 and having electrodes positioned in the combustion chambers 52, respectively.

The crankshaft 22 has a plurality of axially spaced journals 23 rotatably supported by the cylinder block 31 and the crankcase 41, a plurality of axially spaced pins 24 positioned in alignment with the respective cylinders 32 and each coupled to one of the connecting rods 39, and a plurality of pairs of crankshaft counterbalances or webs 25, each pair being connected to one of the pins 24. Each of the journals 23 is rotatably supported between bearings 33, 42 (see FIGS. 2 and 3) in the cylinder block 31 and the crankcase 41.

The crankshaft 22 has a drive gear 26 on an upper crankshaft counterbalance or web 25a corresponding to the second cylinder 32 from above (FIG. 1). The crankshaft 22 also has an upper end projecting out of the crankcase 41 and supporting a drive pulley 27 and a flywheel 28 above the drive pulley 27, and a lower end projecting out of the crankcase 41 and supporting a drive gear 29.

A timing belt 62 is trained around the drive pulley 27 and two driven pulleys 61 mounted respectively on the upper ends of the camshafts 54. An oil filter 63 (see FIG. 4) and a starter motor 64 (see FIGS. 3 and 4) for starting the engine 21 are mounted on a side wall of the crankcase 41.

Figure 3:
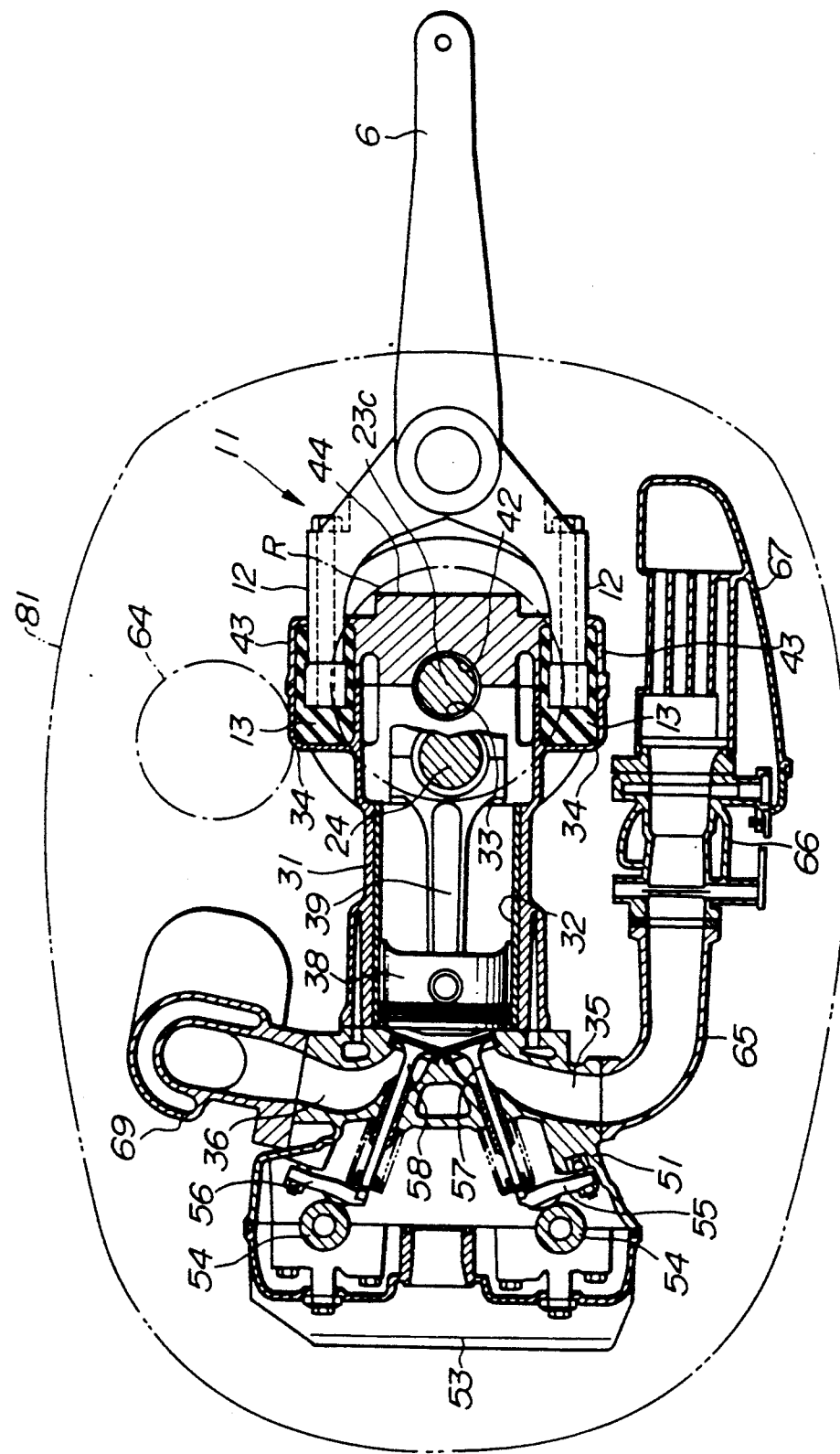
FIG. 3 is a horizontal cross-sectional view of the outboard engine assembly.
Figure 4:
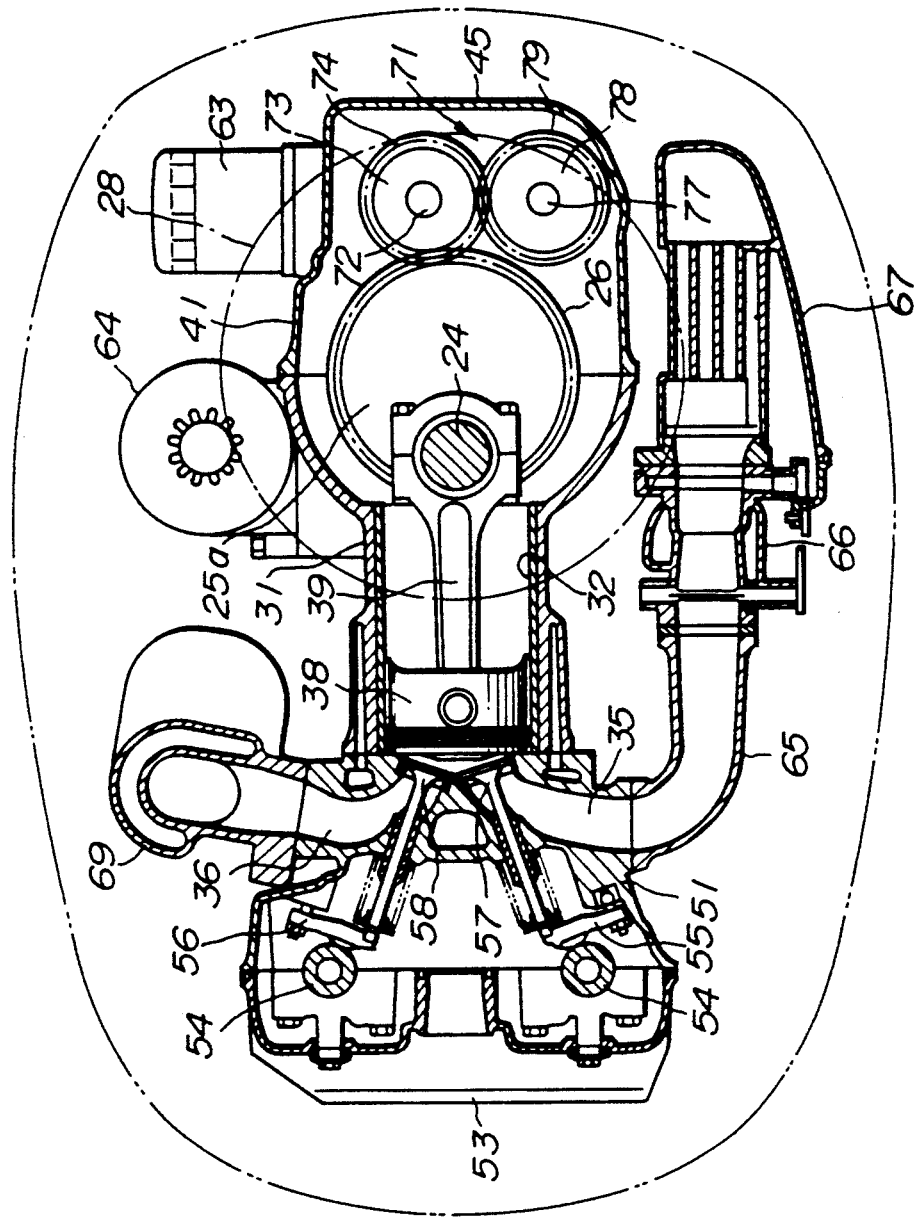
FIG. 4 is a horizontal cross-sectional view of the outboard engine assembly.

As shown in FIGS. 3 and 4, the cylinder head 51 has intake passages 35 defined therein in communication with the respective combustion chambers 52 through the respective intake valves 57 and opening at one side thereof. The open ends of the intake passages 35 are connected to an intake manifold 65 which is connected to a carburetor 66 coupled to an intake chamber 67. The cylinder head 51 also has exhaust passages 36 defined therein in communication with the respective combustion chambers 52 through the respective exhaust valves 58 and opening at the opposite side thereof. The open ends of the exhaust passages 36 are connected to an exhaust manifold 69.

The arms 12 of the upper support 11 are joined to the cylinder block 31 and the crankcase 41 at a position vertically between a lower crankshaft counterbalance or web 25b corresponding to the third cylinder 32 from above (FIG. 1) and an upper crankshaft counterbalance or web 25c corresponding to the lowermost cylinder 32 underneath the third cylinder 32.

Figure 2:
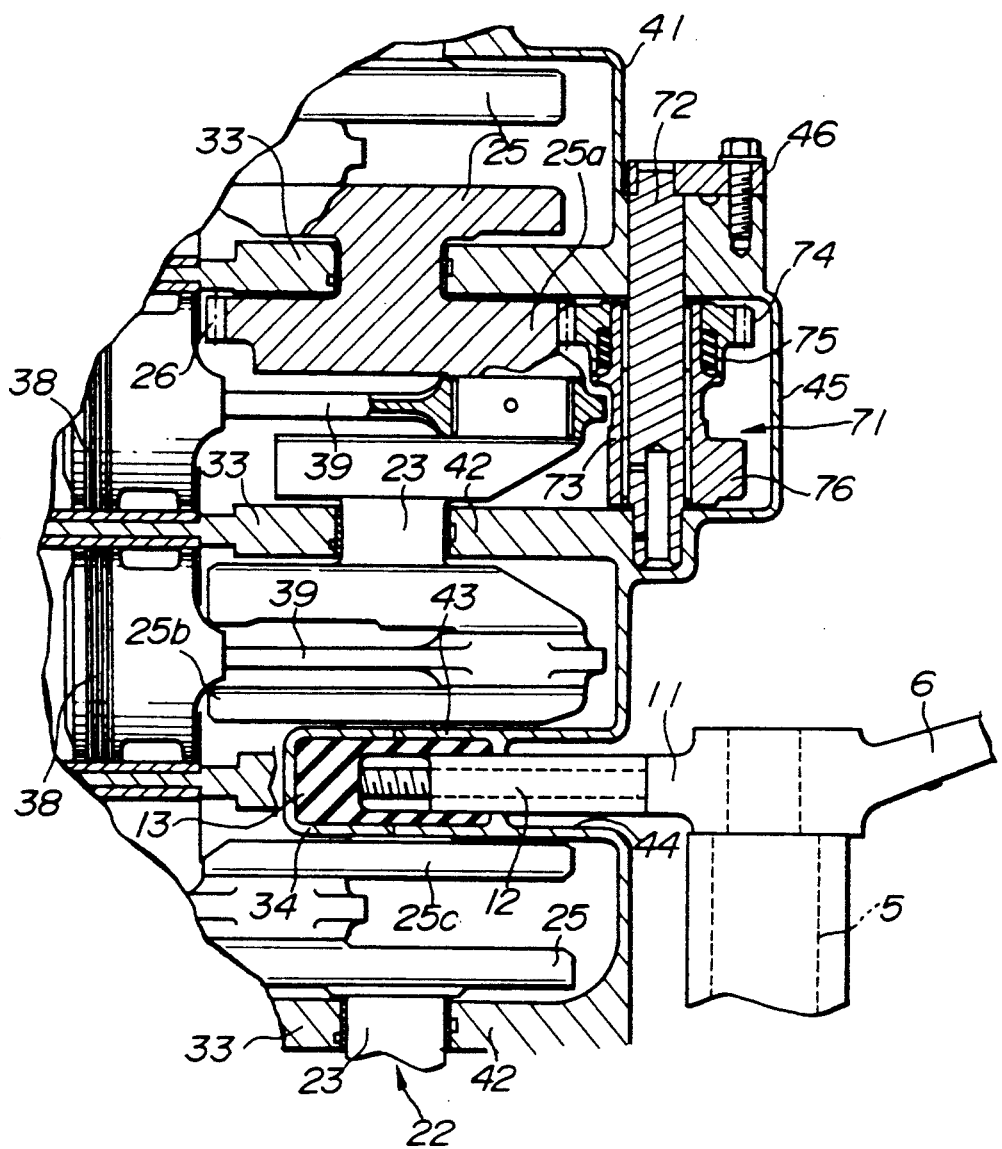
FIG. 2 is an enlarged fragmentary vertical cross-sectional view of the outboard engine assembly.

More specifically, as shown in FIGS. 2 and 3, the cylinder block 31 and the crankcase 41 have a pair of respective integral box-shaped joint casings 34, 43 on one side walls thereof and another pair of respective integral box-shaped joint casings 34, 43 on the opposite side walls thereof. The joint casings 34, 43 are positioned near the opposite sides of the bearings 33, 42 which support a crankshaft journal 23c between the crankshaft counterbalances 25b, 25c, and are held against each other end to end. The joint casings 34, 43 have portions positioned in overlapping relationship to a circular path R of the crankshaft counterbalances 25b, 25c as viewed along the crankshaft 22. The crankcase 41 has a recess 44 defined in a front wall thereof (righthand wall in FIGS. 2 and 3) contiguously to the joint casings 34, 43, the recess 44 receiving portions of the arms 12 therein.

The rubber dampers 13 are disposed in the joint casings 34, 43, and the arms 12 of the upper support 11 are inserted and retained in the respective rubber dampers 13. Through the joint casings 34, 43, the rubber dampers 13, and the arms 12, the engine 21 in the upper region of the outboard engine assembly 1 is supported on the upper end of the swivel shaft 5 of the attachment 1.

As shown in FIGS. 1, 2, and 4, a balancer housing 45 is integrally mounted on the front wall of the crankcase 41 substantially in alignment with the second cylinder 32 from above. The balancer housing 45 accommodates therein a balancer mechanism 71 for attenuating engine vibrations. The balancer mechanism 71 is therefore positioned above the arms 12 and hence the joint casings 34.

The balancer mechanism 71 comprises a first balancer 73 rotatably supported on a first vertical support shaft 72 extending parallel to the crankshaft 22 and a second balancer 78 rotatably supported on a second vertical support shaft 77 extending parallel to the first vertical support shaft 72 and disposed alongside of the first vertical support shaft 72.

A driven gear 74 which is held in mesh with the drive gear 26 on the crankshaft counterbalance 25a of the crankshaft 22 is mounted on the upper end of the first balancer 73 through a rubber damper 75. The drive gear 26 and the driven gear 74 have a gear ratio of 1:2. The first balancer 73 has an integral weight 76 on its lower end. As shown in FIG. 4, the second balancer 78 has an integral driven gear 79 on its upper end which is held in mesh with the driven gear 74 of the first balancer 73, and an integral weight (not shown) on its lower end. As shown in FIG. 2, the first and second vertical support shafts 72, 77 have lower ends supported by the lower wall of the balancer housing 45 and upper ends supported by a cover plate 46 that is fastened to the upper wall of the balancer housing 45 by a bolt.

As shown in FIG. 1, the engine mechanism 20 has an upper cover 81 and a lower cover 82 which house the engine 21, and an extension case 85 disposed beneath the engine 21 and accommodating a vertical shaft 91 therein. The extension case 85 has a pair of joint members 87 on its opposite sides which support the arms 17 of the lower support 16 through respective rubber dampers 18.

The engine 21 and the extension case 85 disposed therebeneath are vertically arranged in the engine mechanism 20, which is coupled to and supported by the swivel shaft 5 through the upper and lower supports 11, 16 including the rubber dampers 13, 18.

The lower cover 82 has an opening 83 defined therein through which the upper support 11 extends horizontally. A rear cover 84 extends between and covers a lower rear portion of the lower cover 82 and an upper rear portion of the extension case 85. An oil pan 88 is connected to the lower surface of the engine 21 and disposed in an upper portion of the extension case 85.

The vertical shaft 91 serves to transmit rotational power from the crankshaft 22 to a propeller shaft (not shown) which supports a propeller (not shown) through a bevel gear mechanism (not shown) in a gearcase (not shown) that is coupled to a lower portion of the extension case 85. The vertical shaft 91 extends through a guide tube 86 that extends vertically in a front portion of the extension case 85.

The crankshaft 22, which extends parallel to the vertical shaft 91, has an axis C that is offset or displaced rearwardly from the axis V of the vertical shaft 91. The vertical shaft 91 supports on its upper end a drive gear 92 held in mesh with the drive gear 29 on the lower end of the crankshaft 22. Therefore, the rotation of the crankshaft 22 is transmitted through the gears 29, 92 to the vertical shaft 91. The upper end of the vertical shaft 91 which supports the driven gear 92 is rotatably supported by bearings in support cups 47, 89 on a lower surface of the crankcase 41 and an upper portion of the oil pan 88.

In the outboard engine assembly of the above structure, the upper support 11 is coupled to the engine 21 that is disposed in the upper region of the engine mechanism 20. The joint casings 34, 43 disposed on the opposite side walls of the cylinder block 31 and the crankcase 41 and supporting the arms 12 of the upper support 11 therein are positioned between the planes of the crankshaft counterbalances 25b, 25c as viewed in side elevation and have portions positioned in the circular path R of the crankshaft counterbalances 25b, 25c as viewed in plan. Therefore, the arms 12 of the upper support 11 are located within the outer profile of the cylinder block 31 and the crankcase 41 as viewed in plan.

Since the upper support 11 is coupled to the engine 21 that is disposed in the upper region of the engine mechanism 20, when the outboard engine assembly is tilted upwardly at the time the boat is anchored or placed ashore, the portion of the outboard engine assembly which projects into the boat is relatively compact. Furthermore, as the arms 12 are located within the outer engine profile as viewed in plan, the transverse dimension or width of the outboard engine assembly is held to a minimum.

The portion of the outboard engine assembly which projects into the boat when it is tilted upwardly is also made compact in view of the fact that the axis C of the crankshaft 22 is offset rearwardly from the axis V of the vertical shaft 91.

In the balancer mechanism 71, the balancers 73, 78 rotate in opposite directions to each other at a speed which is twice the speed of the crankshaft 22. Therefore, the balancer mechanism 71 is effective to cancel secondary vibrations of the crankshaft 22.

Since the driven gear 74 of the first balancer 73 is mounted on the first vertical shaft 72 through the rubber damper 75, noise produced when the driven gear 74 rotate in mesh with the drive gear 26 and the driven gear 79 is minimized. The balancer mechanism 71, which is relatively small in size, is positioned adjacent to the crankshaft 22. Therefore, the balancer mechanism 71 is less responsible for raising the center of gravity of the engine 21 than the conventional balancer mechanism that is positioned in the upper portion of the engine.

The balancer mechanism 71 is disposed near the crankshaft 22 or remotely from the combustion chambers 52, and on the tilt shaft side of the engine 21. That is, the balancer mechanism 71 is positioned in a space above the attachment 1 and forward of the crankshaft 22. Thus, the space which would otherwise be a dead space in front of the crankshaft 22 is effectively utilized by the balancer mechanism 71. The intake manifold 65, the carburetor 66, and the intake chamber 67, which jointly serve as a fuel supply assembly, are disposed on one side of the engine 21, and the oil filter 63 and the starter motor 64 is disposed on the other side of the engine 21. Consequently, the balancer mechanism 71 is held out of physical interference with the intake manifold 65, the carburetor 66, the intake chamber 67, and the oil filter 63 and the starter motor 64.

Figure 5:
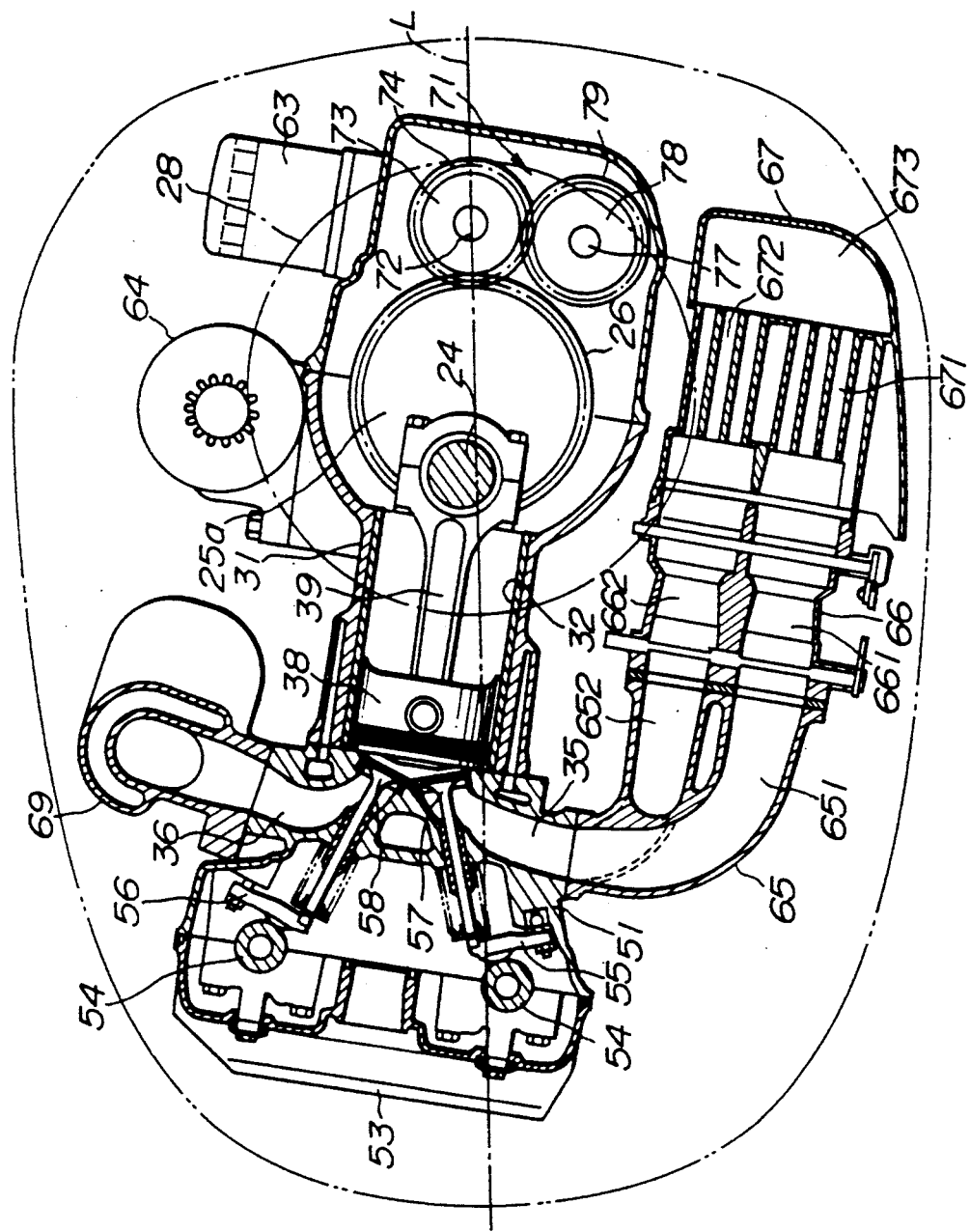
FIG. 5 is a horizontal cross-sectional view of an outboard engine assembly according to another embodiment of the present invention.
Figure 6:
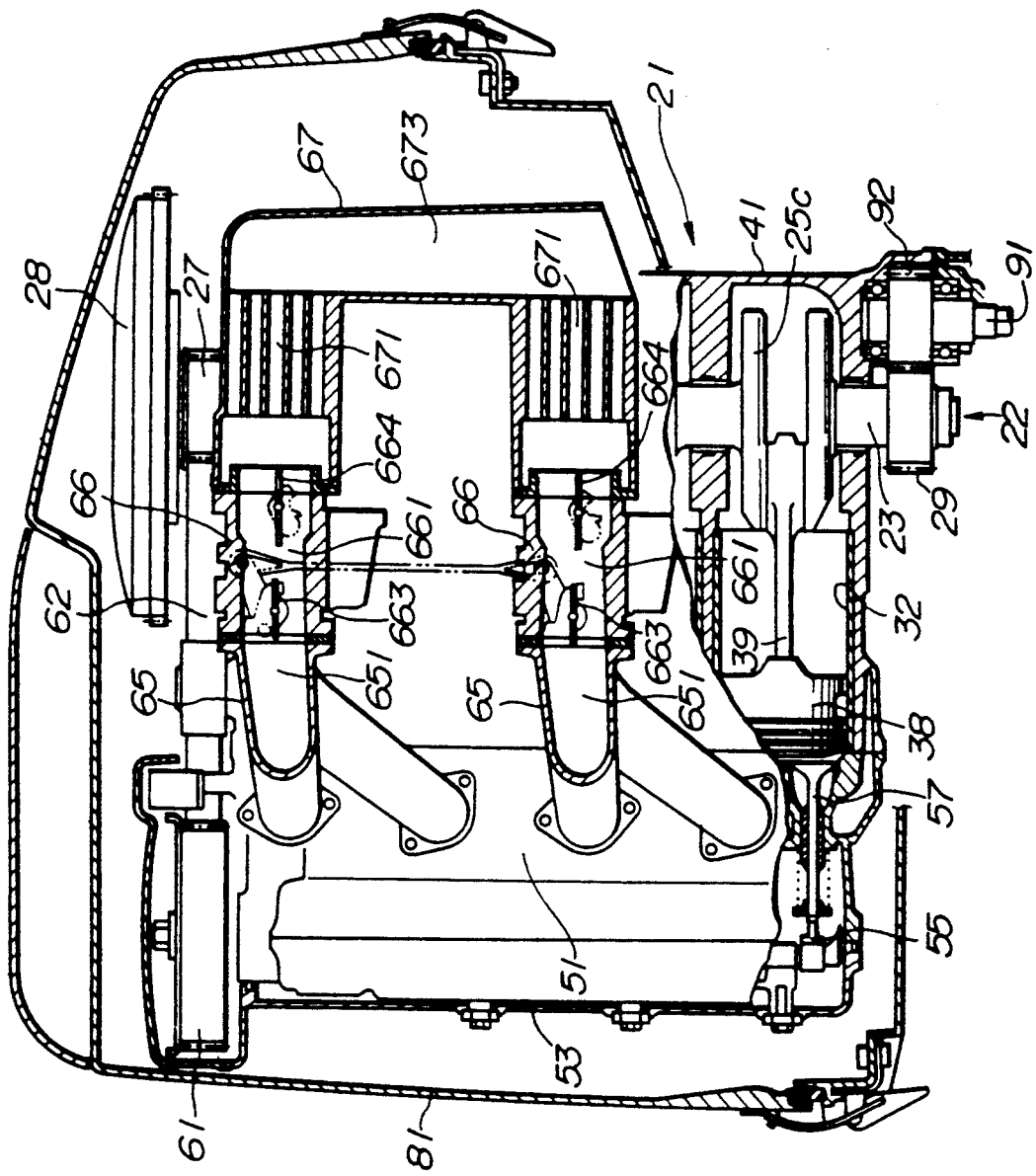
FIG. 6 is a side elevational view, partly cut way, of the outboard engine assembly shown in FIG. 5.

FIGS. 5 and 6 show an outboard engine assembly according to another embodiment of the present invention. The outboard engine assembly shown in FIGS. 5 and 6 differs from the outboard engine assembly shown in FIGS. 1 through 4 with respect to a fuel supply assembly. The other details of the outboard engine assembly shown in FIGS. 5 and 6 are identical to those of the outboard engine assembly shown in FIGS. 1 through 4, and will not be described in detail below.

In this embodiment, the four cylinders 32 of the engine 21 are referred to as first, second, third, and fourth cylinders 32 successively from above.

As shown in FIGS. 5 and 6, the fuel supply assembly has a pair of upper and lower intake manifolds 65 vertically spaced from each other. The upper intake manifold 65 has a first intake passageway 651 connected to the intake passage 35 corresponding to the first, or uppermost, cylinder 32 and curved and extending alongside of and parallel to the first cylinder 32, and a second intake passageway 652 connected to the intake passage 35 corresponding to the second cylinder 32 and curved upwardly and extending parallel to the first cylinder 32. Similarly, the lower intake manifold 65 has a first intake passageway 651 connected to the intake passage 35 corresponding to the third cylinder 32 and curved and extending alongside of and parallel to the third cylinder 32, and a second intake passageway 652 connected to the intake passage 35 corresponding to the fourth, or lowermost, cylinder 32 and curved upwardly and extending parallel to the third cylinder 32. The first and second intake passageways 651, 652 of each of the upper and lower intake manifolds 65 are substantially equal in length to each other.

The fuel supply assembly also has a pair of upper and lower carburetors 66 spaced from each other. The upper carburetor 66 has a first intake barrel 661 extending alongside of and parallel to the first cylinder 32 and connected to the first intake passageway 651 of the upper intake manifold 65, and a second intake barrel 662 extending alongside of and parallel to the first cylinder 32 closer to the first cylinder 32 than the first intake barrel 661 and connected to the second intake passageway 652 of the upper intake manifold 65. Similarly, the lower carburetor 66 has a first intake barrel 661 extending alongside of and parallel to the third cylinder 32 and connected to the first intake passageway 651 of the lower intake manifold 65, and a second intake barrel 662 extending alongside of and parallel to the third cylinder 32 closer to the third cylinder 32 than the first intake barrel 661 and connected to the second intake passageway 652 of the lower intake manifold 65. The upper and lower carburetors 66 have throttle valves 663, 664 disposed in the first and second intake barrels 661, 662, respectively.

An intake chamber 67 has an upper pair of mufflers 671, 672 connected to the first and second intake barrels 661, 662, respectively, of the upper carburetor 66, and a lower pair of mufflers 671, 672 connected to the first and second intake barrels 661, 662, respectively, of the lower carburetor 66. The mufflers 671, 672 of the upper and lower pairs extend alongside of and parallel to the first and third cylinders 32, and are interconnected at their front ends by a cavity 673 which opens downwardly.

The carburetors 66 are positioned upwardly of a bottom wall of the engine 21 and downwardly of the flywheel 28.

As shown in FIG. 5, the outboard engine assembly has a central axis L that is aligned with the longitudinal axis of the boat when the outboard engine assembly is mounted on the boat and tilted downwardly for propelling the boat forwardly. The central axis L passes through the axis of first vertical shaft 72 of the balancer mechanism 71 and the axis C (see FIG. 1) of the crakshaft 22.

When the outboard engine assembly shown in FIGS. 5 and 6 is viewed in side elevation as shown in FIG. 6, since the intake passageways 651, 652 and the upper and lower carburetors 66 extend alongside of the first and third cylinders 32, there are created a space between the upper and lower carburetors 66 and a space below the lower carburetor 66. Accordingly, there is a less limitation on the entire space available on the side of the engine 21 where the fuel supply assembly is disposed.

Inasmuch as the lower carburetor 66 and a lower portion of the intake chamber 67 are positioned alongside of the third cylinder 32, with a space left below the lower carburetor 66, the arms 12 of the upper support 11 (see FIG. 1) which is vertically positioned between the crankshaft counterbalances 25b, 25c are positioned in the space below the lower carburetor 66 and hence kept out of physical interference with the lower carburetor 66 and the intake chamber 67.

Figure 7:
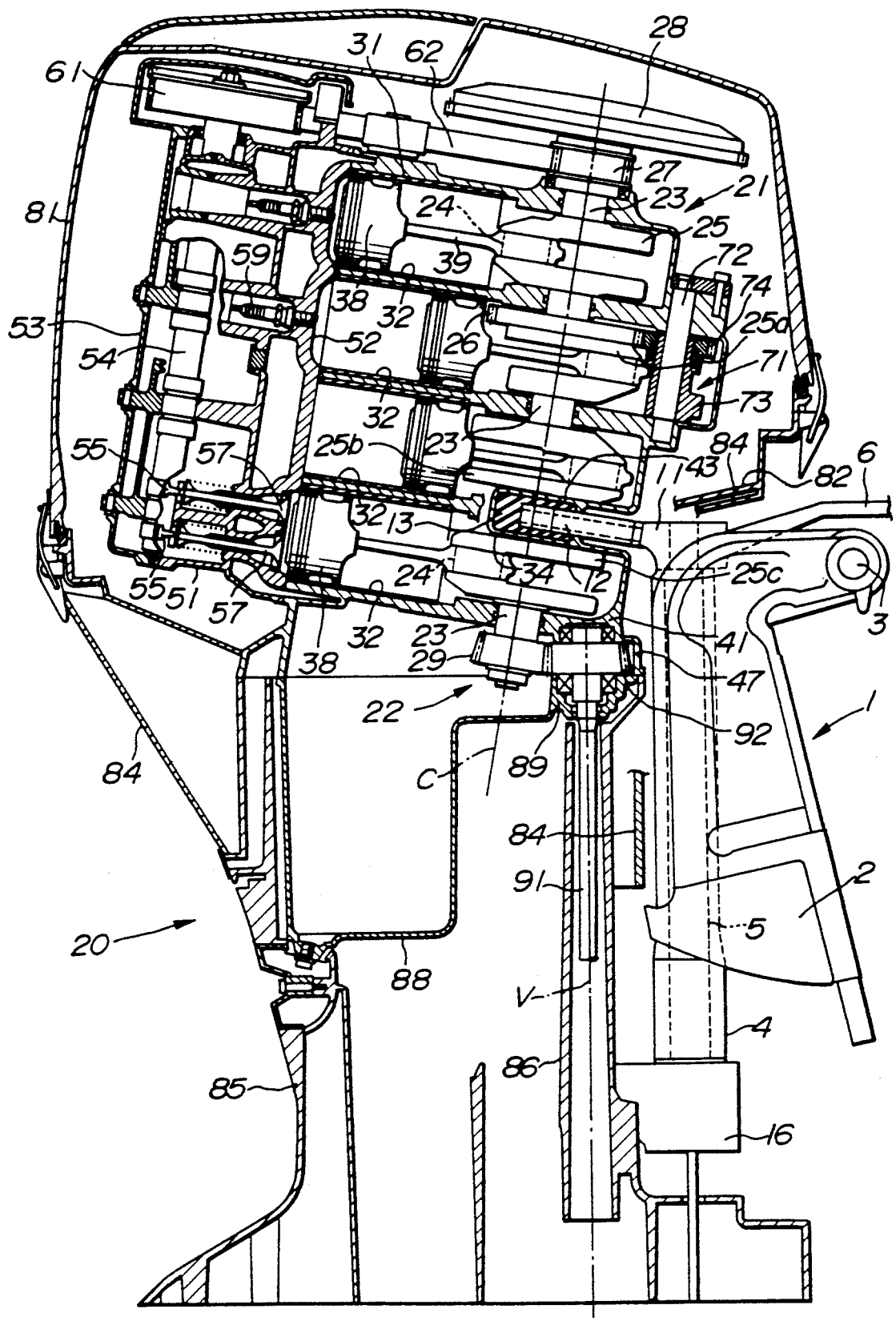
FIG. 7 is a vertical cross-sectional view of an outboard engine assembly according to a still another embodiment of the present invention.

FIG. 7 illustrates an outboard engine assembly according to a still another embodiment of the present invention. Those parts shown in FIG. 7 which are identical to those shown in FIGS. 1 through 6 are denoted by identical reference numerals, and will not be described in detail below.

The outboard engine assembly shown in FIG. 7 differs from the outboard engine assemblies according to the previous embodiments in that the axis C of the crankshaft 22 is inclined such that its upper portion is positioned forwardly of its lower portion, thus tilting the engine 21 in the upper region of the engine mechanism 20 forwardly as viewed in side elevation. With the crankshaft axis C being thus inclined forwardly, the engine 21 supported by the upper support 11 is tilted forwardly, resulting in a reduction in the distance from the swivel shaft 5 to the center of gravity of the engine 21. Therefore, as when the boat jumps while being propelled by the outboard engine assembly, the load applied from the engine 21 to the swivel shaft 5 is reduced, and the swivel shaft 5 is subjected to lower stresses.

In the above embodiments, the outboard engine assemblies are shown as having an in-line four-cylinder four-cycle engine. However, the present invention is also applicable to an outboard engine assembly comprising a two-cylinder engine or a two-cycle engine.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An outboard engine assembly for use on a boat, comprising;
    an engine mechanism including in an upper region thereof an engine having a substantially vertical crankshaft and a vertical array of substantially horizontal cylinders, said crankshaft having a plurality of axially space crankshaft counterbalances; and
    an attachment for mounting said engine mechanism on the stern of the boat, said attachment comprising a stern bracket adapted to be fixed to the stern of the boat, a swivel case supported on said stern bracket for vertical angular movement, a substantially vertical swivel shaft supported on said swivel case for horizontal angular movement, and a pair of upper and lower supports mounted no said swivel shaft and supporting said engine mechanism;

said engine having a pair of horizontally spaced apart joint members coupled to said upper support at a position vertically spaced between and adjacent two of said crankshaft counterbalances which correspond to adjacent two of said cylinders, said crankshaft having an axial portion extending generally vertically and between said spaced apart joint members.

2. An outboard engine assembly according to claim 1, wherein said engine mechanism further comprises a vertical shaft for rotating a propeller shaft, said crankshaft being positioned rearwardly of said vertical shaft, and means between an upper end of said vertical shaft and a lower end of said crankshaft for transmitting rotation of said crankshaft to said vertical shaft.

3. An outboard engine assembly according to claim 2, wherein said crankshaft extends parallel to said vertical shaft.

4. An outboard engine assembly according to claim 2, wherein said crankshaft is inclined such that an upper portion thereof is positioned forwardly of a lower portion thereof as viewed in side elevation.

5. An outboard engine assembly according to claim 1, wherein said engine comprises a crankcase and a cylinder block coupled to said crankcase, said cylinders being defined in said cylinder block, said crankshaft being rotatably supported by said crankcase and said cylinder block, said joint members being mounted on at least one of said crankcase and said cylinder block.

6. An outboard engine assembly according to claim 5, wherein said joint members comprise joint casings mounted on opposite side walls of said crankcase and said cylinder block, and rubber dampers disposed in said joint casings, respectively.

7. An outboard engine assembly according to claim 6, wherein said upper support comprises a pair of horizontally spaced arms extending rearwardly and inserted in said rubber dampers, respectively.

8. An outboard engine assembly for use on a boat, comprising:

an engine mechanism including in an upper region thereof an engine having a substantially vertical crankshaft and a vertical array of substantially horizontal cylinders, said crankshaft having a plurality of axially spaced crankshaft counterbalances, and a vertical shaft disposed below said engine and operatively coupled to said crankshaft for rotating a propeller shaft in response to rotation of the crankshaft; and an attachment for mounting said engine mechanism on the stern of the boat, said attachment comprising a stern bracket adapted to be fixed to the stern of the boat, a swivel case supported on said stern bracket for vertical angular movement, a substantially vertical swivel shaft supported on said swivel case for horizontal angular movement, and a pair of upper and lower supports mounted on said swivel shaft and supporting said engine mechanism;

said crankshaft being positioned rearwardly of said vertical shaft.

9. An outboard engine assembly according to claim 8, further comprising means between an upper end of said vertical shaft and a lower end of said crankshaft for transmitting rotation of said crankshaft to said vertical shaft.

10. An outboard engine assembly according to claim 8, wherein said crankshaft extends parallel to said vertical shaft.

11. An outboard engine assembly for use on a boat, comprising:

an engine mechanism including in an upper region thereof an engine having a substantially vertical crankshaft; and an attachment having a pair of upper and lower supports for mounting said engine mechanism on the stern of the boat;

said engine having joint members coupled to said upper support, and a balancer mechanism disposed upwardly of said joint members;

said balancer mechanism comprising a support shaft extending parallel to said crankshaft, a driven gear mounted on said support shaft, and a weight mounted on said support shaft, said crankshaft including a counterbalance having a drive gear held in mesh with said driven gear.

12. An outboard engine assembly according to claim 11, wherein said engine has a vertical array of substantially horizontal cylinders including respective combustion chambers, said balancer mechanism being mounted on a front wall of said engine remotely from said combustion chambers.

13. An outboard engine assembly according to claim 11, wherein said balancer mechanism further comprises a second support shaft extending parallel to said crankshaft, a second driven gear mounted on said support shaft and held in mesh with said driven gear, and a second weight disposed on said second support shaft.

14. An outboard engine assembly according to claim 11, wherein said engine has a vertical array of substantially horizontal cylinders including respective combustion chambers, said engine mechanism including a balancer housing disposed on a front wall of said engine remotely from said combustion chambers, said balancer mechanism being disposed in said balancer housing.

15. An outboard engine assembly according to claim 11, wherein said balancer mechanism further comprises a rubber damper through which said driven gear is mounted on said support shaft.

16. An outboard engine assembly according to claim 11, wherein said engine further includes a vertical array of substantially horizontal cylinders, said crankshaft having a plurality of said axially spaced crankshaft counterbalances;

said attachment further comprising a stern bracket adapted to be fixed to the stern of the boat, a swivel case supported on said stern bracket for vertical angular movement, and a substantially vertical swivel shaft supported on said swivel case for horizontal angular movement, said upper and lower supports being mounted on said swivel shaft;

said engine joint members being coupled to said upper support at a position vertically spaced between and adjacent two of said crankshaft counterbalances which correspond to adjacent two of said cylinders, respectively said crankshaft having an axial portion extending generally vertically and between said spaced apart joint members.

17. An outboard engine assembly according to claim 16, wherein said cylinders include respective combustion chambers, said balancer mechanism being mounted on a front wall of said engine remotely from said combustion chambers.

18. An outboard engine assembly according to claim 16, wherein said balancer mechanism further comprises a second support shaft extending parallel to said crankshaft, a second driven gear mounted on said support shaft and held in mesh with said driven gear, and a second weight disposed on said second support shaft.

19. An outboard engine assembly according to claim 16, wherein said cylinders include respective combustion chambers, said engine mechanism having a balancer housing disposed on a front wall of said engine remotely from said combustion chambers, said balancer mechanism being disposed in said balancer housing.

20. An outboard engine assembly according to claim 16, wherein said balancer mechanism further comprises a rubber damper through which said driven gear is mounted on said support shaft.

21. An outboard engine assembly for use on a boat, comprising:
an engine mechanism including in an upper region thereof an engine having a substantially vertical crankshaft and a vertical array of substantially horizontal cylinders, and a vertical shaft disposed below said engine and operatively coupled to said crankshaft for rotating a propeller shaft in response to rotation of the crankshaft; and
an attachment for mounting said engine mechanism on the stern of the boat, said attachment comprising a stern bracket adapted to be fixed to the stern of the boat, a swivel case supported on said stern bracket for vertical angular movement, a substantially vertical swivel shaft supported on said swivel case for horizontal angular movement, and a pair of upper and lower supports mounted on said swivel shaft and supporting said engine mechanism;
said crankshaft being positioned rearwardly of said vertical shaft;
said engine further having joint members coupled to said upper support, and a balancer mechanism disposed upwardly of said joint members;
said balancer mechanism comprising a support shaft extending parallel to said crankshaft, a driven gear mounted on said support shaft, and a weight mounted on said support shaft, said crankshaft including a counterbalance having a drive gear held in mesh with said driven gear.

22. An internal combustion engine, comprising:
a vertical crankshaft;
a vertical array of horizontal cylinders including respective combustion chambers;
a plurality of pistons slidably disposed in said cylinders, respectively, and operatively coupled to said vertical crankshaft;
fuel supply means mounted on an engine side wall for supplying fuel into said combustion chambers;
a starter motor mounted on an opposite engine side wall for rotating said crankshaft; and
a balancer mechanism operatively coupled to said crankshaft and mounted on an engine wall other than said engine side walls remotely from said combustion chambers, said balancer mechanism comprising a support shaft extending parallel to said crankshaft, a driven gear mounted on said support shaft, and a weight mounted on said support shaft, said crankshaft including a counterbalance having a drive gear held in mesh with said driven gear.

23. An internal combustion engine according to claim 22, wherein said balancer mechanism further comprises a second support shaft extending parallel to said crankshaft, a second driven gear mounted on said support shaft and held in mesh with said driven gear, and a second weight disposed on said second support shaft.

24. An internal combustion engine according to claim 22, further comprising a balancer housing disposed on a front wall of said engine remotely from said combustion chambers, said balancer mechanism being disposed in said balancer housing.

25. An internal combustion engine according to claim 22, wherein said balancer mechanism further comprises a rubber damper through which said driven gear is mounted on said support shaft.

26. An outboard engine assembly for use on a boat, comprising:
an engine mechanism including in an upper region thereof an engine having a substantially vertical crankshaft, an even number of at least four substantially horizontal cylinders arranged in a vertical array and having respective combustion chambers, a plurality of intake passages communicating with said combustion chambers, respectively, and opening at an engine side wall, and fuel supply means mounted on said engine side wall for supplying fuel into said intake passages; and
an attachment for mounting said engine mechanism on the stern of the boat;
said fuel supply means comprising a vertical array of carburetors each associated with adjacent two of said cylinders, and a vertical array of intake manifolds each connecting one of said carburetors to adjacent two of said cylinders, each of said carburetors comprising a pair of first and second intake barrels disposed alongside of and parallel to one of the adjacent two cylinders, each of said intake manifolds comprising a pair of first and second intake passageways, said first intake passageway connecting said first intake barrel to one of said intake passages corresponding to the adjacent two cylinders, said second intake passageway connecting said second intake barrel to the other of said intake passages corresponding to the adjacent two cylinders, said attachment comprising a pair of upper and lower supports supporting said engine mechanism, said engine having joint members coupled to said upper support, said carburetors being positioned upwardly of said upper support.

27. An outboard engine assembly according to claim 26, wherein said carburetors are respectively disposed alongside of the first and third cylinders from above of said vertical array of cylinders, said joint members being mounted on said side wall on either side of said engine between said third cylinder and the lowermost cylinder.

* * * * *